(12) United States Patent
Xiong et al.

(10) Patent No.: US 7,657,648 B2
(45) Date of Patent: Feb. 2, 2010

(54) HYBRID TREE/MESH OVERLAY FOR DATA DELIVERY

(75) Inventors: Yongqiang Xiong, Beijing (CN); Guobin (Jacky) Shen, Beijing (CN)

(73) Assignee: Microsoft Corporation, Redmond, WA (US)

( * ) Notice: Subject to any disclaimer, the term of this patent is extended or adjusted under 35 U.S.C. 154(b) by 391 days.

(21) Appl. No.: 11/766,665

(22) Filed: Jun. 21, 2007

(65) Prior Publication Data

US 2008/0317050 A1  Dec. 25, 2008

(51) Int. Cl.
*G06F 15/16* (2006.01)
*G06F 15/173* (2006.01)

(52) U.S. Cl. .................. 709/231; 709/230; 709/232; 709/234; 709/238; 709/239

(58) Field of Classification Search .......... 709/230, 709/231, 232, 234, 238, 239
See application file for complete search history.

(56) References Cited

U.S. PATENT DOCUMENTS

| | | | |
|---|---|---|---|
| 6,148,000 A * | 11/2000 | Feldman et al. ............ | 370/397 |
| 6,377,972 B1 | 4/2002 | Guo et al. | |
| 6,691,312 B1 | 2/2004 | Sen et al. | |
| 6,732,182 B1 * | 5/2004 | Beverly, IV ................ | 709/230 |
| 6,963,575 B1 * | 11/2005 | Sistanizadeh et al. ....... | 370/404 |
| 7,203,743 B2 | 4/2007 | Shah-Heydari | |
| 7,397,789 B2 * | 7/2008 | Chari et al. ................ | 370/351 |
| 2003/0043821 A1 * | 3/2003 | Van Den Bosch et al. ... | 370/400 |
| 2003/0120917 A1 | 6/2003 | Itonaga et al. | |
| 2003/0126277 A1 * | 7/2003 | Son et al. ................... | 709/231 |
| 2003/0223357 A1 | 12/2003 | Lee | |
| 2004/0143672 A1 | 7/2004 | Padmanabham et al. | |
| 2004/0143678 A1 * | 7/2004 | Chari et al. ................ | 709/240 |
| 2004/0215802 A1 | 10/2004 | Amini et al. | |
| 2004/0236863 A1 | 11/2004 | Shen et al. | |
| 2005/0010674 A1 | 1/2005 | Taniguchi et al. | |

(Continued)

FOREIGN PATENT DOCUMENTS

WO  WO2004107679(A2)   12/2004

OTHER PUBLICATIONS

Gnasa et al. Cooperative Pull-Push Cycle for Searching a Hybrid P2P Network. Citeseer. 2004. http://citeseer.ist.psu.edu/viewdoc/summary?doi=10.1.1.59.972.*

(Continued)

*Primary Examiner*—Dohm Chankong
*Assistant Examiner*—Hieu T Hoang
(74) *Attorney, Agent, or Firm*—Lee & Hayes, PLLC

(57) ABSTRACT

Hybrid tree/mesh overlays for data delivery involve using a tree overlay network and a mesh overlay network to delivery a data stream via a push mechanism and a pull mechanism, respectively. In an example embodiment, a network node enters a mesh overlay network and attaches to a tree overlay network. In operation, the network node receives data blocks of a data stream over the tree overlay network via a push mechanism. The network node ascertains if a data block is not received over the tree overlay network. If a data block is missing, the network node retrieves the missing data block over the mesh overlay network via a pull mechanism. In another example embodiment, the tree overlay network includes a subset of nodes forming a tree-based backbone. Network nodes that are identified as being stable may join the backbone and provide the data stream to other nodes.

20 Claims, 12 Drawing Sheets

U.S. PATENT DOCUMENTS

| | | | |
|---|---|---|---|
| 2005/0091399 A1 | 4/2005 | Candan et al. | |
| 2005/0198290 A1* | 9/2005 | Berkey et al. | 709/225 |
| 2005/0201278 A1 | 9/2005 | Banerjee et al. | |
| 2005/0239438 A1* | 10/2005 | Naghian | 455/410 |
| 2006/0098607 A1* | 5/2006 | Zeng et al. | 370/338 |
| 2006/0212582 A1 | 9/2006 | Gupta et al. | |
| 2007/0165657 A1* | 7/2007 | Smith et al. | 370/401 |
| 2008/0268855 A1* | 10/2008 | Hanuni et al. | 455/445 |
| 2009/0037968 A1* | 2/2009 | Liu et al. | 725/114 |

OTHER PUBLICATIONS

Zhang et al. A peer-to-peer network for live media streaming using a push-pull approach. USPTO ePortal. 2005. http://portal.acm.org/citation.cfm?id=1101206.*

Zhou et al. A hybrid overlay network for video-on-demand. IEEE. 2005. http://ieeexplore.ieee.org/xpls/abs_all.jsp?arnumber=1494558.*

Venkataraman et al. Chunkyspread: Heterogeneous Unstructured Tree-Based Peer-to-Peer Multicast. IEEE. 2006. http://ieeexplore.ieee.org/xpls/abs_all.jsp?arnumber=4110273.*

Liao, et al., "AnySee: Peer-to-Peer Live Streaming", available at least as early as Apr. 24, 2007, at <<http://www.cs.ust.hk/~liu/AnySee.pdf>>, IEEE, 2006, pp. 1-10.

Moen, "Overview of Overlay Multicast Protocols", available at least as early as Apr. 24, 2007, at <<http://bacon.gmu.edu/XOM/pdfs/Multicast%20Overview.pdf>>, pp. 1-16.

Tewari, et al, "Analytical Model for BitTorrent-based Live Video Streaming", available at least as early as Apr. 24, 2007, at <<http://www.lk.cs.ucla.edu/PS/nime07f.pdf>>, pp. 1-5.

Zhang, et al., "CoolStreaming/DONet: A Data-driven Overlay Network for Peer-to-Peer Live Media Streaming", available at least as early as Apr. 24, 2007, at <<http://csce.unl.edu/~fxian/csce990/CoolStreaming.pdf, IEEE, 2005, pp. 1-10.

* cited by examiner

Example Participation in a Hybrid Tree/Mesh Data Delivery

FIG. 6  Example Interaction with a Tree-Based Backbone

Example Hybrid Tree/Mesh Data Delivery Implementer

Example of High-Degree-Preemption

Example of Low-Delay-Jump

900

HYBRID TREE/MESH OVERLAY FOR DATA DELIVERY

BACKGROUND

Data streams, such as live media data, are being communicated over point-to-point networks with increasing frequency. The sizes of the data streams, in terms of both the temporal length and the instantaneous bandwidth demands, are increasing as well. Data streams can be communicated from a single source to multiple destinations using a unicast approach. With unicasting, the source usually sends a separate and complete data stream to each individual destination.

Alternatively, data streams can be communicated from a single source to multiple destinations using a multicast approach. With multicasting, the source usually sends the entire data stream to a limited number of initial nodes, such as one or more routers. These initial nodes then forward the data stream to multiple other nodes. The data stream may be copied and split at a given intermediate node when required to eventually reach an intended destination. These multiple other nodes likewise forward the data stream to still other nodes. Ultimately, the intended multiple destinations are reached. Hence, multicasting can generally facilitate the communication of a data stream from a source to many destinations even when the source has (or other intermediate nodes have) finite processing capabilities and/or bandwidth constraints.

Traditional multicasting has been implemented at the network layer. However, the limited deployment of network-layer multicasting has motivated researchers to try to implement multicasting at the application layer. More recently, some multicasting efforts have been directed to the application-layer. At the application layer, end-hosts can not only receive the data stream, but they may also be recruited to forward the data stream to other end-hosts. Application-layer multicasting creates a new set of challenges that have heretofore not been remedied by existing approaches or technologies.

SUMMARY

Hybrid tree/mesh overlays for data delivery involve using a tree overlay network and a mesh overlay network to deliver a data stream via a push mechanism and a pull mechanism, respectively. In an example embodiment, a network node enters a mesh overlay network and attaches to a tree overlay network. In operation, the network node receives data blocks of a data stream over the tree overlay network via a push mechanism. The network node ascertains if a data block is not received over the tree overlay network. If a data block is missing, the network node retrieves the missing data block over the mesh overlay network via a pull mechanism. In another example embodiment, the tree overlay network includes a subset of nodes forming a tree-based backbone. Network nodes that are identified as being stable may join the backbone and provide the data stream to other nodes. Node stability may be determined responsive to an age of a node and a temporal stability threshold.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other method, system, scheme, apparatus, device, media, procedure, API, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Figure 1:
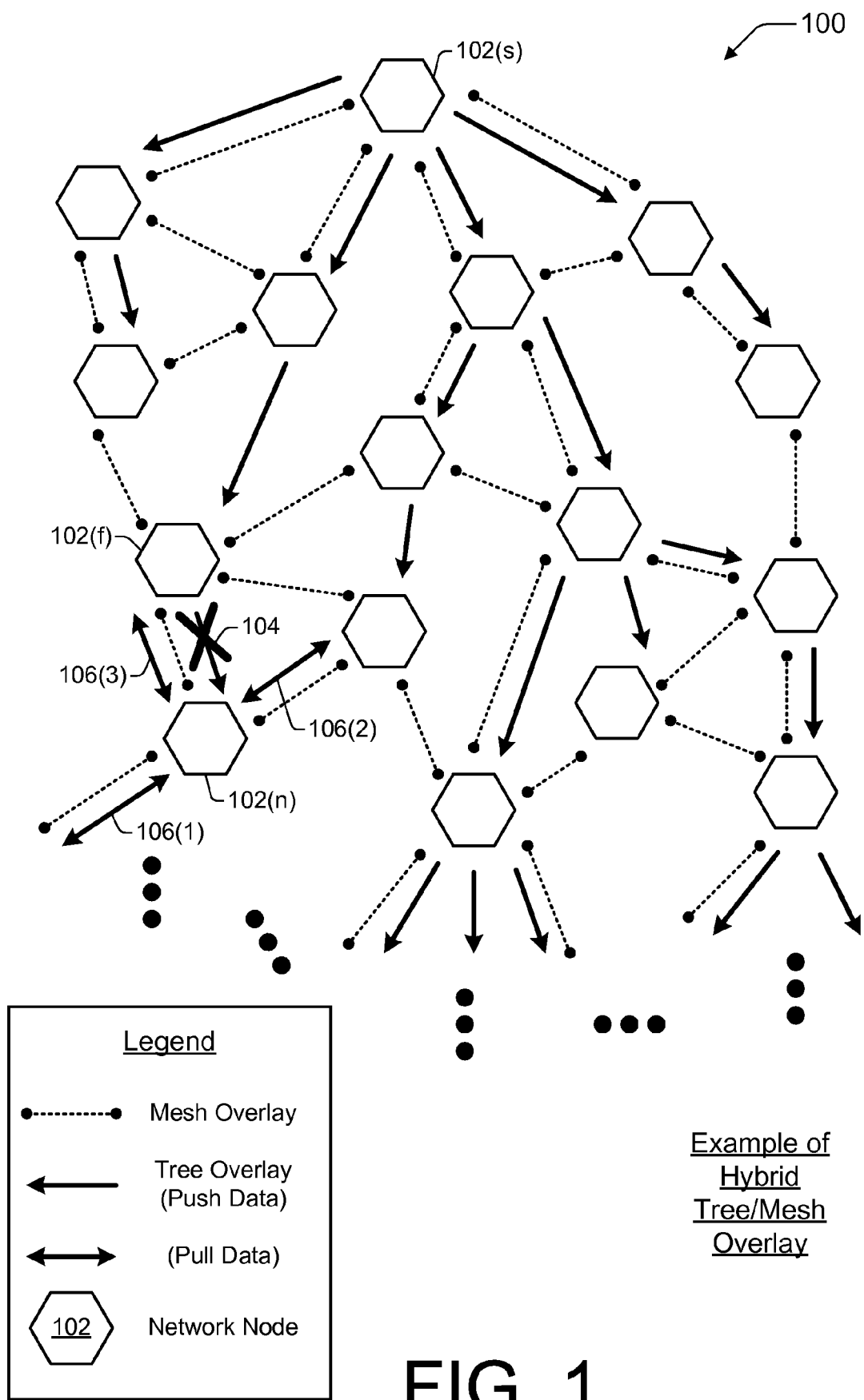
FIG. 1 is a diagram illustrating an example network of nodes that may be used to implement hybrid tree/mesh overlays for data delivery.

Introduction to Hybrid Tree/Mesh Overlay for Data Delivery

Application layer multicasting can be used for delivering a data stream, such as a live media streaming, over one or more networks, such as the Internet. A tree is one potential structure for a multicast network overlay, but it is vulnerable in the presence of autonomous end-hosts. A data-driven approach can employ a mesh out of overlay nodes so that they can exchange data; this mesh structure greatly enhances communication resilience. However, it suffers from an efficiency-latency tradeoff, given that the data has to be pulled from mesh neighbors with periodic notifications.

More specifically, one example approach to application-layer multicasting is that the end-hosts may be organized into a tree for data delivery. A tree structure, however, is vulnerable to node dynamics, such as the departure or failure of a node. This vulnerability is particularly acute for node dynamics that are close to the source because they may cause data outage in a number of descendants. Tree structures thus have to be frequently repaired. Another example approach is data-driven randomized overlays that can be relatively resilient. Such systems can construct a mesh network out of the overlay nodes such that each node independently selects some other nodes as neighbors and exchanges data with them.

A difference between the tree and the mesh overlay networks lays in their data delivery strategies. In a tree structure, a data stream is pushed along defined routes. On the other hand, given multiple and dynamic neighbors, a node in a mesh structure pulls data to avoid significant redundancies. Consequently, a mesh-based system can be more robust, but it typically experiences longer delays and has higher control overhead. More explicitly, there is an efficiency-latency tradeoff: if the mesh nodes choose to send notifications for every data block arrival, then the overhead is excessive; alternatively, although sending periodic notifications can reduce the overhead, it also increases the latencies.

In contrast to these separate overlay network approaches, an example hybrid tree/mesh overlay approach that leverages both network overlay types for delivering data streams is described herein. In an example embodiment, the tree overlay can facilitate delivering much of the data stream in normal steady-state circumstances. The mesh overlay facilitates handling node dynamics in the tree-based backbone. Implementing a mesh overlay can also better utilize the available bandwidth between overlay nodes.

When a hybrid tree/mesh overlay network is to be employed, seamless data delivery using both push and pull mechanisms can be implemented. In an example embodiment, a set of stable nodes is identified to construct a tree-based backbone, with much of the data usually being pushed over this backbone. These stable nodes, together with other unstable nodes, are further organized through an auxiliary mesh overlay. When a tree-based backbone is to be formed from stable nodes, these stable nodes may be identified responsive to the age of each node.

Other example, more-specific embodiments include the following. In one, stable nodes are identified in a tree overlay, and a tree-based backbone is gradually built up. A temporal stability threshold, which may vary between nodes, is used in conjunction with node ages to identify which nodes are likely to have higher expected service times and can thus be deemed sufficiently stable to join the tree-based backbone. In another example embodiment, the respective push and pull data delivery mechanisms of the two respective tree and mesh overlays are reconciled. They can work complementarily for joint efficiency in the presence of autonomous nodes. Also, a buffer partitioning and scheduling scheme coordinates push/pull delivery mechanisms and can avoid data redundancy. Other general and specific example embodiments are described herein below.

Example Embodiments for Hybrid Tree/Mesh Overlays for Data Delivery

1: Introduction—Example Environments and General Embodiments

FIG. 1 is a diagram 100 illustrating an example network of nodes 102 that may be used to implement hybrid mesh/tree overlays for data delivery. As indicated by the legend, network nodes 102 are represented generally by hexagons in diagram 100. Links of a mesh overlay network are represented by small-dashed lines terminating at dots. Links of a tree overlay network are represented by solid unidirectional arrows.

These unidirectional arrows also represent data delivered via a push mechanism. Bidirectional arrows represent data delivered via a pull mechanism. The pull data is delivered over links of the mesh overlay. Mesh overlay links also indicate neighbor nodes for individual network nodes in the mesh overlay network.

Each network node 102 may be comprised of all or any part of a device that is capable of forming a node in a wireless and/or a wired network. Examples of network nodes 102 include, but are not limited to, a general personal computer (e.g., notebook, desktop, portable, etc.); a client, server, or workstation computer; a television-based device; an entertainment appliance (including portable ones); a mobile phone; a gaming device; a personal digital assistant (PDA); any device or part thereof that is operating at an application layer within the network; a device otherwise described herein; some combination thereof; and so forth. An example embodiment for a device that is capable of realizing a network node 102 is described herein below with particular reference to FIG. 12.

In an example embodiment, there are "n" network nodes 102, with "n" representing some integer. As indicated by the ellipses, other network nodes that are not explicitly illustrated in diagram 100 may be included in the overall network. Network node 102(s) is the source node that originates a data stream. By way of example but not limitation, the following characteristics may be evidenced: First, the network may comprise a structured or unstructured peer-to-peer (P2P) network. Second, the data stream may be a live media data stream that is being multicasted. Third, network nodes 102 may be end-hosts that are operating at an application layer. Fourth, the data stream may be divided into data blocks, which may be of equal or approximately equal length.

Generally, the tree overlay accepts a primary role for delivering the data stream via a push mechanism as indicated by the unidirectional arrows. However, when data (e.g., a data block) of the data stream is not received over the tree overlay network via the push mechanism, the data may be retrieved over the mesh overlay network via a pull mechanism. The data may be requested and received from a neighbor node in the mesh overlay network, which accepts a secondary role for delivering the data stream.

An example failure scenario is described: Push data from network node 102(f) experiences a failure as indicated by the "X" at 104. This failure may be a bandwidth rate reduction, a temporary communication delay, a complete transmission cessation, and so forth. To reduce, if not prevent, a disruption in the ability to utilize (e.g., play) the data stream in a timely manner at network node 102(n), network node 102(n) can retrieve any missing data from neighbor nodes over the mesh overlay network at pull data 106(1) and/or at pull data 106(2). If network node 102(f) is still functioning from a mesh overlay perspective, network node 102(n) can also attempt to retrieve any missing data at pull data 106(3).

Figure 2:
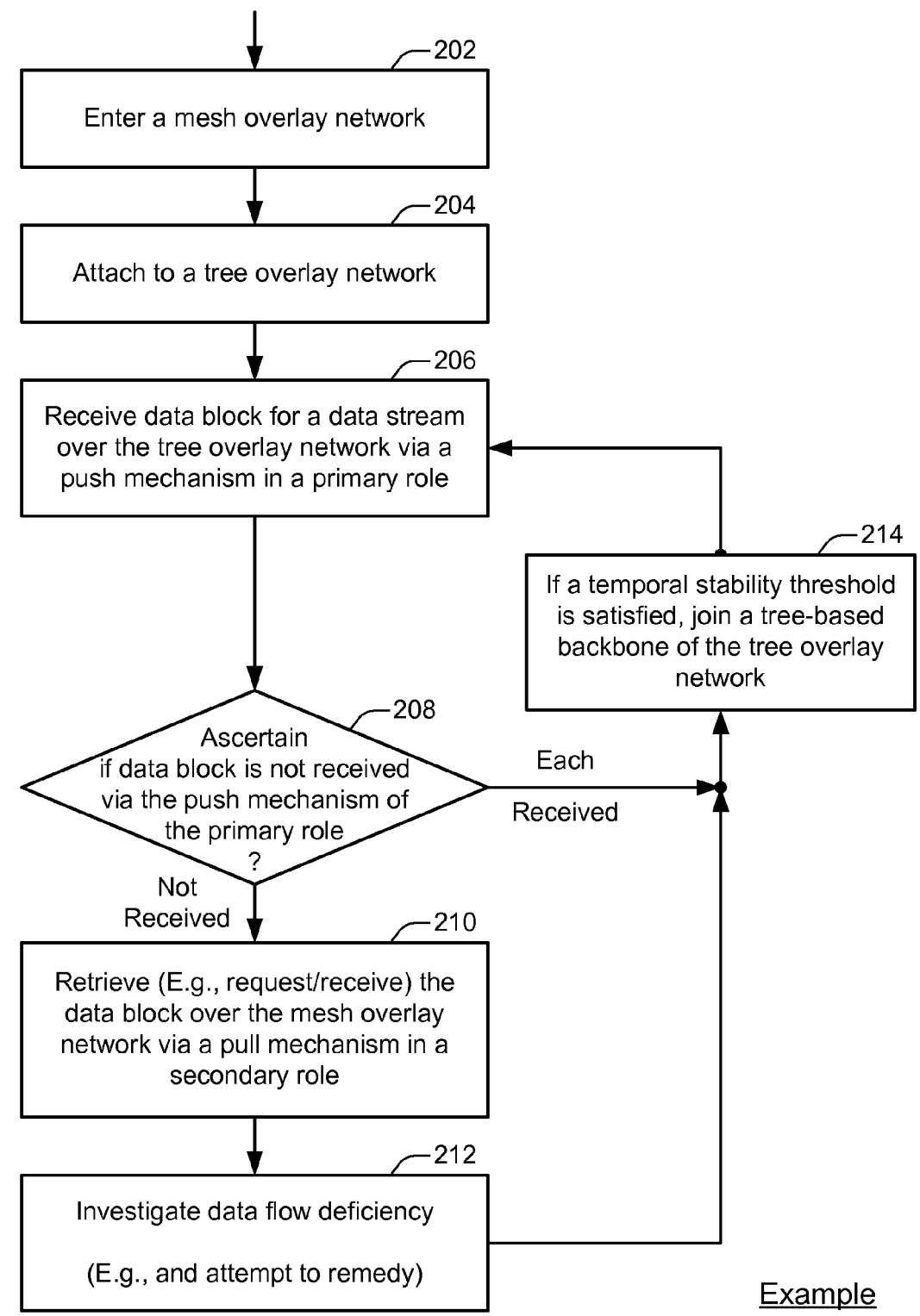
FIG. 2 is a flow diagram that illustrates an example of a method for participating in a hybrid tree/mesh overlay data delivery.
Figure 6:
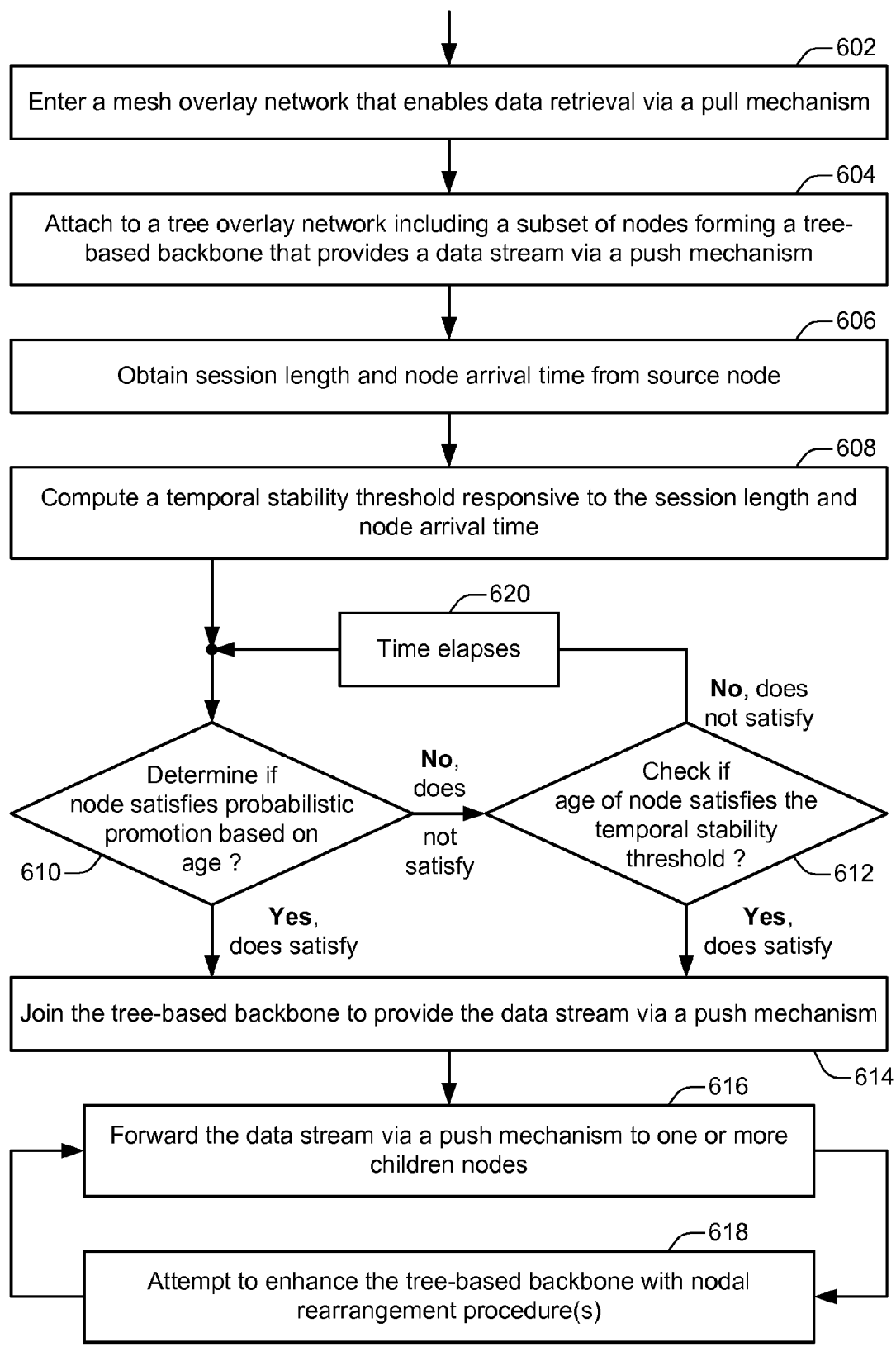
FIG. 6 is a flow diagram that illustrates an example of a method for interacting with a tree-based backbone of a hybrid tree/mesh overlay.
Figure 11:
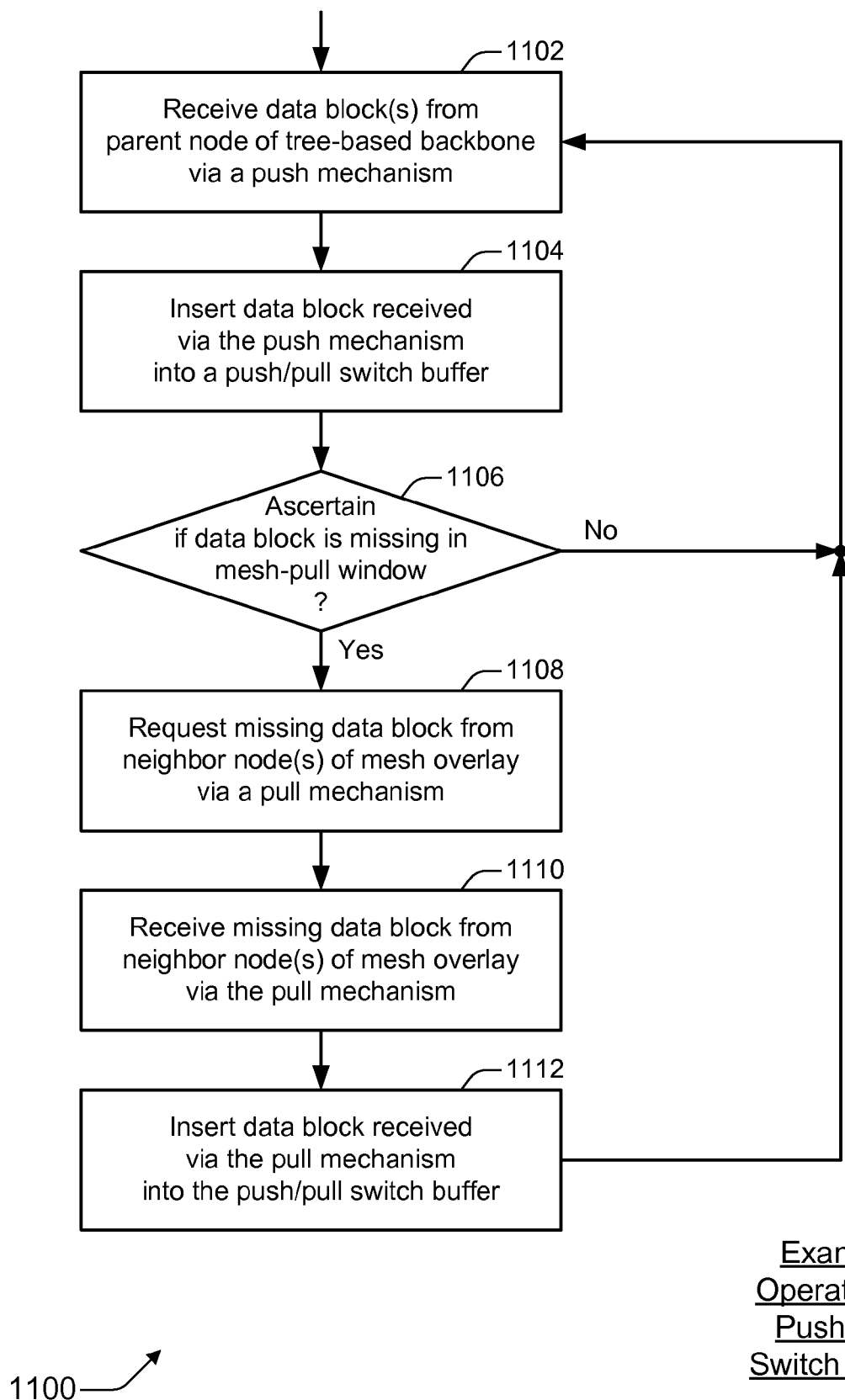
FIG. 11 is a flow diagram that illustrates an example of a method for operating a push/pull switch buffer.

In the drawings, FIGS. 2, 6, and 11 are flow diagrams 200, 600, and 1100, respectively. Implementations of flow diagrams 200, 600, and 1100 may be realized, for example, as processor-executable instructions. Processor-executable instructions may be embodied as software, firmware, hardware, fixed logic circuitry, some combination thereof, and so forth. The acts of these flow diagrams may be performed in many different environments, with a number of different devices, and/or in a variety of different network configurations. The order in which the methods are described is not intended to be construed as a limitation, and any number of the described blocks can be combined, augmented, rearranged, and/or omitted to implement a respective method, or an alternative method that is equivalent thereto.

FIG. 2 is a flow diagram 200 that illustrates an example of a method for participating in a hybrid mesh/tree overlay data delivery. Flow diagram 200 includes seven (7) blocks 202-214. In an example embodiment, at block 202, a mesh overlay network is entered. For example, a network node 102 may begin participating in a mesh overlay network. At block 204, the network node attaches to a tree overlay network. At block 206, a data block for a data stream is received over the tree overlay network via a push mechanism that is operating in a primary role.

At block 208, it is ascertained if a data block is not received via the push mechanism in accordance with the primary delivery role. If each data block is received, then the method of flow diagram 200 continues at block 214, which is described below. If a data block is not received, then at block 210 the data block is retrieved over the mesh overlay network via a pull mechanism that is operating in a secondary delivery role. For example, a network node may request and receive the data block from one or more mesh overlay network neighbor nodes.

At block 212, the data flow deficiency as evidenced by a missing data block is investigated. If possible, the deficiency may be remedied as well. For example, the network node may attach to a different parent node in the tree overlay network. This is described further herein below with particular reference to FIGS. 3 and 4.

At block 214, if a temporal stability threshold is satisfied, a tree-based backbone of the tree overlay network is joined. For example, if an age of the network node satisfies (e.g., meets, equals, surpasses, etc.) a temporal stability threshold, the network node may be considered stable, and it may join the tree-based backbone, including by becoming a parent node that provides the data stream to one or more children nodes. Examples for a tree-based backbone are described further herein below with particular reference to FIGS. 3-6. Examples implementations for a temporal stability threshold are also described herein below.

2: Example Specific Embodiments

In an example embodiment, a data stream is delivered using a tree overlay network and a mesh overlay network. The tree overlay network includes a tree-based backbone. The tree-based backbone comprises a subset of the nodes of the tree overlay network. This subset includes the stable nodes of the tree overlay network. Other non-stable nodes are attached to the backbone at the outskirts of the tree overlay network. Under normal circumstances, most of the data stream is pushed through the tree-based backbone to eventually reach the outskirts.

Figure 3:
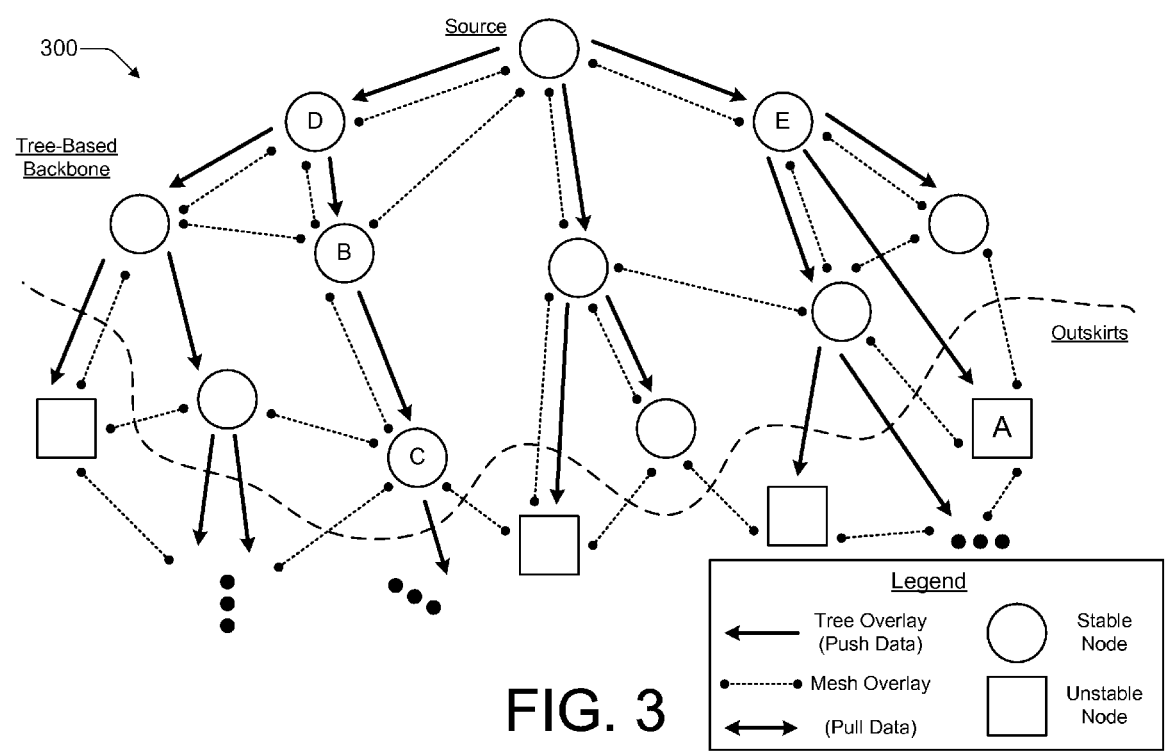
FIG. 3 is a diagram illustrating an example hybrid tree/mesh overlay with a tree-based backbone formed from stable nodes.

FIG. 3 is a diagram illustrating an example hybrid mesh/tree overlay 300 with a tree-based backbone formed from stable nodes. As indicated by the legend, circles represent stable network nodes, and squares represent unstable network nodes. The solid unidirectional arrows represent the tree overlay network for the push data. The small-dashed lines with terminating dots at each end represent the mesh overlay network; the mesh overlay network can be used for pull data.

In an example embodiment, the stable nodes form the tree-based backbone. Each node that attaches to the tree overlay network, and the tree-based backbone thereof, is capable of receiving the data stream via a push mechanism. Each node that joins the tree-based backbone, such as node B, is also capable of providing the data stream to one or more children nodes, such as node C, via the push mechanism. Node D is a parent node for node B, and node B is a parent node for node C.

The unstable nodes are located in the outskirts of the tree overlay network outside of the tree-based backbone. The unstable nodes do not act as a parent node within the tree overlay network. However, both stable and unstable nodes can retrieve (and provide in response to a request) data blocks via a pull mechanism of the mesh overlay network. This is further described herein below with particular reference to FIG. 4 in which node B experiences a failure.

Usually, a relatively small tree-based backbone can be sufficient to support a larger tree overlay network. As evidence, and by way of example only, consider a simple K-ary tree of height H. The fraction of its internal nodes (e.g., those belonging to the backbone) is no more than 1/K if the tree is complete and balanced $$\left( \sum_{i=0}^{L-2} K^i \bigg/ \sum_{i=0}^{H-1} K^i < \frac{1}{K} \right).$$

In practice, its size can be further reduced if we permit some unstable nodes to be a multi-hop away from the tree-based backbone. Consequently, the construction and maintenance overheads for the backbone can be relatively low, especially if its nodes are stable.

Thus, the stability of nodes is to be identified using a scheme or schemes. Generally, in overlay multicast systems, nodes with a higher age tend to stay longer with the multicast session. Thus, node stability may be inferred by examining nodal ages. We describe herein below a temporal-stability-threshold-based scheme for identifying stable nodes.

A tree-based backbone, however, cannot completely eliminate repairing operations because even relatively stable nodes are not absolutely persistent. Moreover, the potential bandwidth between the unstable nodes is largely ignored by the tree-based backbone. Hence, to increase the resilience and efficiency of the tree-based backbone approach, the network nodes are also organized into a mesh overlay network.

For an example embodiment of the mesh overlay network, each network node keeps (at least) a partial list of the active overlay nodes and their status. This local list facilitates the node's locating a set of mesh neighbors as well as its dedicated backbone parent. To keep the list updated, a light-weighted, scalable, random gossip algorithm, for example, may be used for the nodes to periodically exchange their status information. The mesh neighbor nodes also periodically exchange their buffer maps. However, a node need not actively schedule the automatic fetching of data blocks from neighbors using such data availability information. Instead, data block retrieval can be invoked when there is a data delivery outage in the backbone.

Figure 4:
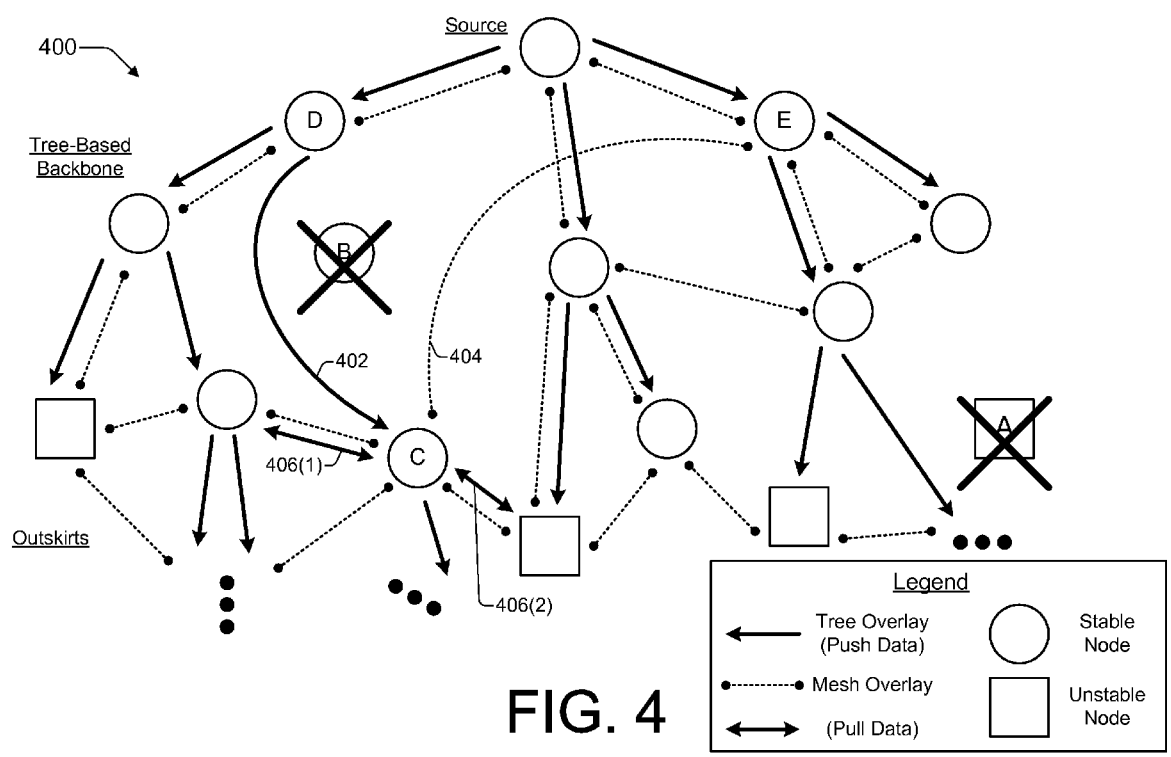
FIG. 4 is a diagram illustrating an example hybrid tree/mesh overlay with a tree-based backbone in which a stable node has ceased participating in the data delivery.

FIG. 4 is a diagram illustrating an example hybrid mesh/tree overlay 400 with a tree-based backbone in which a stable node has ceased participating in the data delivery. Hybrid mesh/tree overlay 400 is similar to hybrid mesh/tree overlay 300 (of FIG. 3) except that two illustrated nodes A and B have failed. In an example embodiment, when an unstable node in the outskirts, such as node A, fails (e.g., experiences an error, departs, etc.), it does not affect the downstream data push along the tree-based backbone because the unstable nodes do not forward the data stream via the push mechanism.

Nodes promoted to the tree-based backbone, on the other hand, are stable and are expected to seldom depart. Even if a stable node does depart, the impact can be mitigated with help from the mesh overlay network. For example, consider the departure (or other failure) of node B. While node C is affected, it can retrieve missing data blocks from its mesh neighbors over the mesh overlay network via the pull mechanism until it re-attaches to the tree-base backbone.

For instance, node C can retrieve data block(s) via the pull mechanism at pull data 406(1) and 406(2). These data retrievals over the mesh overlay network can be from stable or unstable nodes. Node C also reattaches to the tree-based backbone to re-establish data reception over the tree overlay network as indicated by the push data 402 from node D. Because node C is also a stable node (and responsible for forwarding the data stream to at least one downstream child node), node C may also rejoin the tree-based backbone network as a parent therein. Node C can also reestablish an additional mesh overlay network connection to another node, such as node E, as indicated by the mesh overlay link 404.

To realize such a hybrid tree/mesh overlay for data streaming, one or more of a number of example embodiments may be implemented. First, stable nodes in the overlay can be identified in accordance with some scheme. Second, the stable nodes can be positioned so as to form the tree-based backbone. This backbone can also be evolved so as to enhance data block delivery. Third, the tree and mesh overlays can be reconciled so as to enable seamless data delivery. Examples for the establishment, evolution, and enhancement of the tree-based backbone are described next. Example interactions between the tree overlay network and the mesh overlay network are described further below.

In an example embodiment, the stability of a node is considered to be proportional to its duration in the overlay. Unfortunately, this cannot be known with complete certainty before the node actually departs the network. However, this duration can be predicted using the node age in the session, which is the time elapsed since its arrival. As noted above, network nodes that already have relatively higher ages tend to stay relatively longer. Consequently, the node age can be used, at least partially, to infer its stability. If the age is above a certain threshold (e.g., a temporal stability threshold), for example, the node can be considered stable and can be joined to the tree-based backbone. Once a stable node is moved into the tree-based backbone, it can remain there until it departs the session or the session concludes.

The effectiveness of the tree-based backbone can be impacted by the temporal stability threshold. If the threshold is set too low, unstable nodes can be promoted to the tree-based backbone. On the other hand, if the threshold is set too high, too few nodes might be considered stable and moved into the backbone. In an example embodiment, an Expected Service Time (EST) of a network node is determined by selecting an appropriate temporal stability threshold. The EST and other variables are described in Table 1 below.

TABLE 1

Listing of Notation Descriptions.

| Notation | Description |
| --- | --- |
| L | Session length |
| t | Node arrival time |
| L − t | Residual session length at time t |
| s | Node age |
| EST(t) | Expected service time in backbone for a node arriving at t |
| T(t) | Temporal stability threshold for a node arriving at t |
| f(x) | Probability distribution function of node duration |
| k, $x_m$ | Shape and location parameters of Pareto distribution |

For an example embodiment, a temporal stability threshold can be determined as follows: Let L be the length of the session, and let η(x) be the probability distribution function (PDF) of the node duration in the session. Because a node starts serving in the tree-based backbone when its age exceeds its corresponding temporal stability threshold, for a backbone node arriving at time t, its EST(t) can be calculated as the expected duration minus the corresponding threshold, T(t), that is, $$EST(t) = \frac{\int_{T(t)}^{L-t} x \cdot f(x) \cdot dx}{\int_{T(t)}^{L-t} f(x) \cdot dx} - T(t).$$

By way of example only, for some data streams, such as video data streams, the durations of participating clients generally follow a Pareto distribution. The Pareto distribution has parameters k and $X_m$ (here, k is a shape parameter that determines how skewed the distribution is, and $X_m$ is a location parameter that determines where the distribution starts). We then have the following result, $$EST(t) = \frac{\int_{T(t)}^{L-t} \frac{kx_m^k}{x^{k+1}(1 - x_m^k(L-t)^{-k})} \cdot x \cdot dx}{\int_{T(t)}^{L-t} f(x) \cdot dx} - T(t)$$

$$= \frac{\frac{kx_m^k}{(k-1)(1 - x_m^k(L-t)^{-k})}\left(\frac{1}{T^{(k-1)}(t)} - \frac{1}{(L-t)^{k-1}}\right)}{\frac{x_m^k}{(1 - x_m^k(L-t)^{-k})}\left(\frac{1}{T^k(t)} - \frac{1}{(L-t)^k}\right)} - T(t)$$

$$= \frac{k\left(\frac{1}{T^{(k-1)}(t)} - \frac{1}{(L-t)^{k-1}}\right)}{(k-1)\left(\frac{1}{T^k(t)} - \frac{1}{(L-t)^k}\right)} - T(t)$$

Letting $$x_t = \frac{T(t)}{L-t},$$

which can be considered as a normalized temporal stability threshold, we have:

$$EST(t) = \frac{k\left(\frac{1}{x_t^{k-1}(L-t)^{k-1}} - \frac{1}{(L-t)^{k-1}}\right)}{(k-1)\left(\frac{1}{x_t^k(L-t)^k} - \frac{1}{(L-t)^k}\right)} - x_t(L-t)$$

$$= (L-t)\left(\frac{k\left(\frac{1}{x_t^{k-1}} - 1\right)}{(k-1)\left(\frac{1}{x_t^k} - 1\right)}\right) = (L-t)g(x_t)$$

for $$g(x_t) = \frac{k\left(\frac{1}{x_t^{k-1}} - 1\right)}{(k-1)\left(\frac{1}{x_t^k} - 1\right)}.$$

Hence, to likely maximize EST(t), we attempt to maximize $g(x_t)$ with respect to $x_t$. For a typical Pareto distribution, curves of g(x) with different k values can be graphed. For a typical value close to 1, $g(x_t)$ is maximized when $x_t$ is about 0.3. In other words, the temporal stability threshold for a node arriving at time t can be set to be 30% of the residual session length L−t. The parameter k can instead be estimated online, and the temporal stability threshold can then be adjusted accordingly. Alternatively, other distributions can be used to compute a temporal stability threshold. Furthermore, temporal stability thresholds for promoting a node to stable status can be determined in other manners.

In an example embodiment, and given a temporal stability threshold, network nodes can establish and evolve into a stable tree-based backbone as follows. It is assumed, without loss of generality, that the source node alone is in the tree-based backbone initially. Each network node that is newly-attached to the tree overlay network obtains L and t from the source node, as well as (at least) a partial list of the existing overlay nodes. (Alternatively, the source node can compute the temporal stability threshold and send it to the newly-attached node.) At least one node in the listing is to already be in the tree-based backbone. The new node then attaches itself to one of the tree-based backbone nodes, and it also locates mesh neighbor node(s) using the list.

Figure 5:
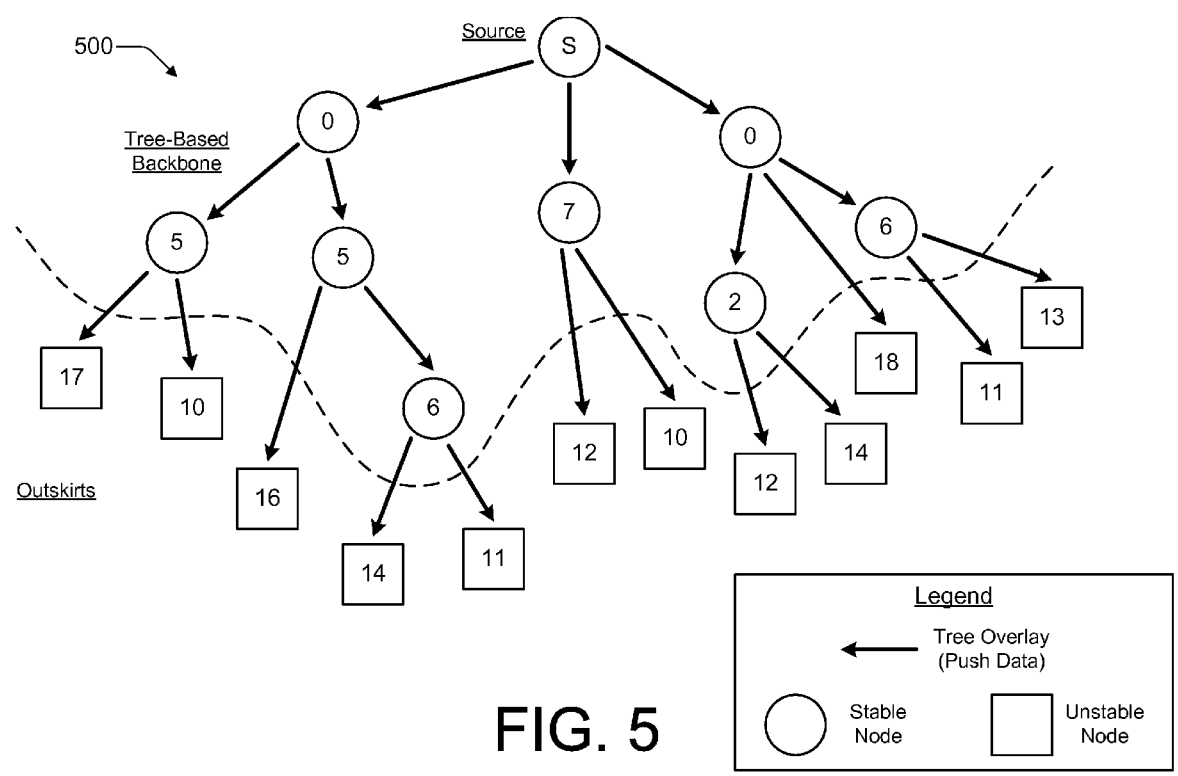
FIG. 5 is a diagram illustrating a hybrid tree/mesh overlay that illustrates an example scheme for establishing and evolving a tree-based backbone as network nodes attain stability.

FIG. 5 is a diagram illustrating a hybrid tree/mesh overlay 500 that illustrates an example scheme for establishing and evolving a tree-based backbone as network nodes attain stability. As indicated by the legend, stable network nodes are represented by circles, and unstable network nodes are represented by squares. The unidirectional arrows represent links along the tree overlay network.

If a network node is not in the tree-based backbone, it periodically checks its own age in the overlay network. Once the age of the node satisfies (e.g., meets, exceeds, equals, etc.) the temporal stability threshold T(t), the node promotes itself as a stable backbone node. In hybrid tree/mesh overlay 500, the numeric label within each network node indicates the arrival time of the node. Example illustrated arrival times include zero (0), 2, 5, 10, 14, and 17 time units.

In this example promotion scheme, before time T(0), no node but the source can be included in the tree-based backbone, which reduces the efficiency of data delivery in the early periods. To alleviate this lack of efficiency, a randomized, probabilistic promotion operation may be employed for some initial period of the data stream delivery session. In an example embodiment, the algorithmic operation strives to achieve a probability s/T(t) for a network node to be in the tree-based backbone when its age is s. To realize a, e.g., linearly increasing probability s/T(t), each non-backbone node independently checks its status per unit time. For the s-th check (e.g., at time t+s), the network node is promoted to the tree-based backbone with a probability of $1/(T(t)-s+1)$ (and 0 for s=0). Alternatively, the source node (or another network node) may be responsible for determining when a given node is to be promoted to the tree-based backbone using a probabilistic or a non-probabilistic criterion.

Theorem 4.1: In the above example promotion scheme, at (discrete) time s(<T(t)), the probability that a network node of age s resides in the tree-based backbone is s/T(t). Proof: The probability that the node is in the tree-based backbone is given by:

$$1 - \prod_{k=1}^{s}\left(1 - \frac{1}{T(t)-k+1}\right) = 1 - \prod_{k=1}^{s}\frac{T(t)-k}{T(t)-k+1}$$

$$= 1 - \frac{T(t)-1}{T(t)} \cdot \frac{T(t)-2}{T(t)-1} \cdots \frac{T(t)-s}{T(t)-s+1}$$

$$= 1 - \frac{T(t)-s}{T(t)} = \frac{s}{T(t)}$$

Promotions that occur prior to when a nodal age satisfies the temporal stability threshold can accelerate the establishment of the tree-based backbone. Theses early probabilistic promotions can also potentially reduce the churn of the tree-based backbone with a built-in randomness. When each individual node performs its own promotion computations and/or promotion determinations/checks, the promotion operation can be implemented in a distributed manner with no extra message exchanges among the overlay nodes.

FIG. 6 is a flow diagram 600 that illustrates an example of a method for interacting with a tree-based backbone of a hybrid mesh/tree overlay. Flow diagram 600 includes ten (10) blocks 602-620. In an example embodiment, at block 602, a network node enters a mesh overlay network that enables data retrieval via a pull mechanism. At block 604, the network node attaches to a tree overlay network including a subset of nodes forming a tree-based backbone that provides a data stream via a push mechanism.

At block 606, the network node obtains a session length and a node arrival time (for the node) from a source node. At block 608, a temporal stability threshold is computed responsive to the session length and node arrival time. As noted above, the source node may alternatively provide a computed temporal stability threshold.

At block 610, the network node determines if a probabilistic promotion criterion is satisfied based on the current age of the node. For example, a likelihood of nodal promotion to the tree-based backbone can increase as time elapses. If the probabilistic promotion criterion is satisfied, then the method of flow diagram 600 continues at block 614, which is described below.

If, on the other hand, the probabilistic promotion criterion is not satisfied, then at block 612 the node checks if its current age satisfies the temporal stability threshold. If its current age does not satisfies the temporal stability threshold, then as time elapses as indicated at block 620 and the node's age thus increases, the probabilistic promotion criterion may be considered again at block 610 (e.g., repeatedly, at regular intervals, randomly, etc.). If, on the other hand, the current age of the node does satisfy the temporal stability threshold (as checked at block 612), the method continues at block 614.

At block 614, the network node joins the tree-based backbone to provide the data stream via a push mechanism. For example, the network node can promote itself to a stable status and offer to become a parent by providing the data stream to one or more downstream children nodes via the push mechanism of the tree overlay network.

At block 616, the network node forwards the data stream via a push mechanism to one or more children nodes. At block 618, the network node, possibly in conjunction with other network nodes, can attempt to enhance the tree-based backbone with one or more nodal rearrangement procedure(s). Examples of nodal rearrangement procedures include, by way of example but not limitation, high-degree-preemption, low-delay-jump, and so forth. These are described further herein below in the context of evolving the tree-based backbone with particular reference to FIGS. 8 and 9. The acts of blocks 616 and 618 can be repeated while the data stream session continues.

Figure 7:
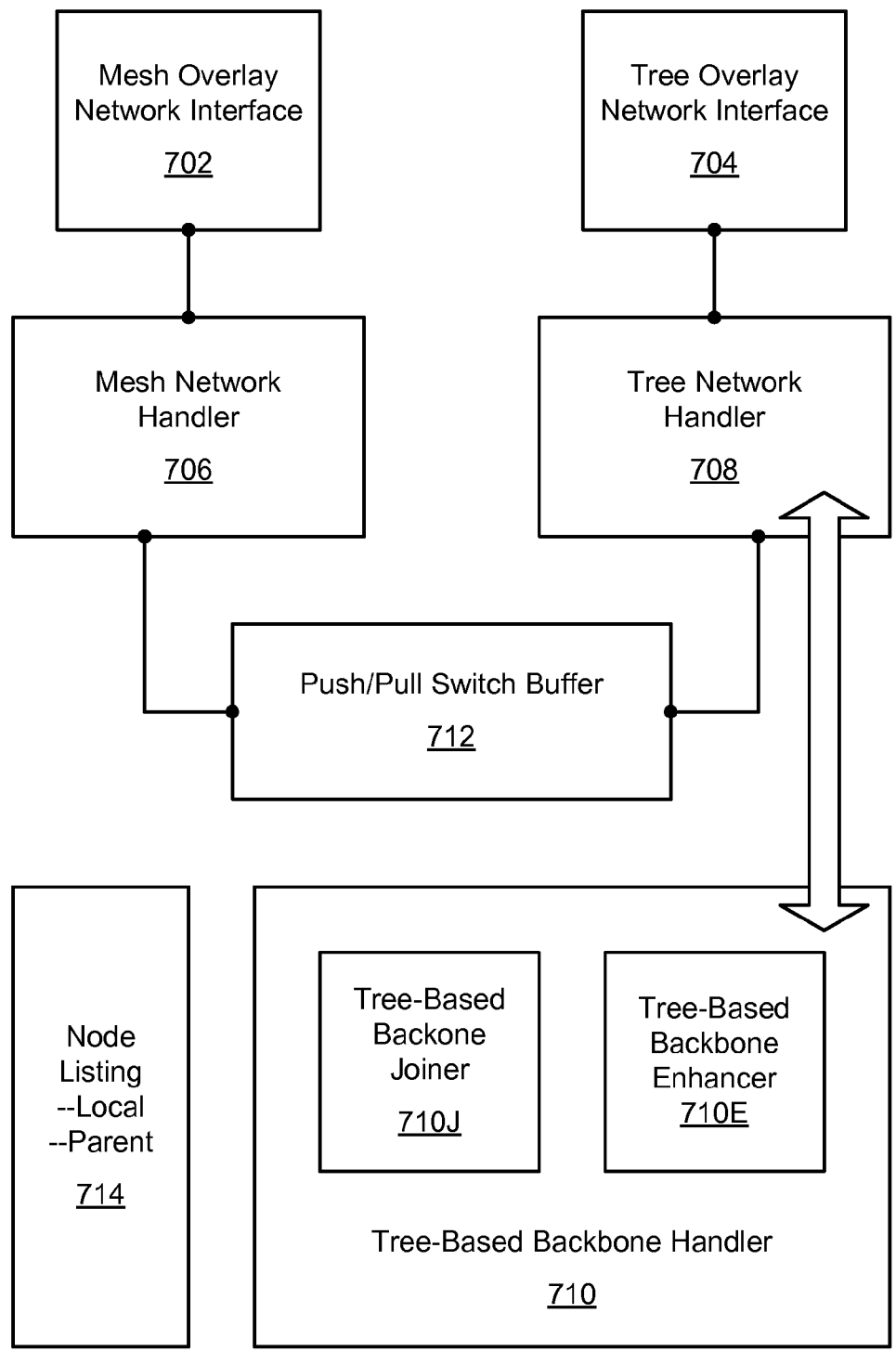
FIG. 7 is a block diagram illustrating an example hybrid tree/mesh data delivery implementer.

FIG. 7 is a block diagram illustrating an example hybrid mesh/tree data delivery implementer 700. The components of hybrid mesh/tree data delivery implementer 700 can be realized, for example, as processor-executable instructions. Hence, they may be embodied as software, firmware, hardware, fixed logic circuitry, some combination thereof, and so forth. Hybrid mesh/tree data delivery implementer 700 may comprise at least a portion of a network node.

As illustrated, hybrid mesh/tree data delivery implementer 700 includes the following components: a mesh overlay network interface 702, a tree overlay network interface 704, a mesh network handler 706, a tree network handler 708, a tree-based backbone handler 710, a push/pull switch buffer 712, and a node listing 714. Tree-based backbone handler 710 includes a tree-based backbone joiner 710J and a tree-based backbone enhancer 710E. Tree-based backbone handler 710, wholly or partly, may be coupled to and/or integrated with tree network handler 708.

In an example general embodiment, mesh overlay network interface 702 empowers a node to enter a mesh overlay network that enables data retrieval via a pull mechanism. Tree overlay network interface 704 empowers a node to attach to a tree overlay network. The tree overlay network may include a subset of nodes forming a tree-based backbone that provides a data stream via a push mechanism. Tree network handler 708 empowers a node to receive data blocks of the data stream over the tree-based backbone of the tree overlay network via the push mechanism.

Mesh network handler 706 empowers a node to retrieve missed data blocks over the mesh overlay network via the pull mechanism. Missed data blocks are those data blocks that are not received over the tree-based backbone of the tree overlay network. Tree-based backbone joiner 710J checks if an age of the node satisfies a temporal stability threshold. If so, tree-based backbone joiner 710J empowers the node to join the tree-based backbone to provide the data stream via the push mechanism.

Example embodiments for tree-based backbone enhancer 710E are described herein below with particular reference to FIGS. 8 and 9. Example embodiments for push/pull switch buffer 712 are described herein below with particular reference to FIGS. 10 and 11. Node listing 714 is a data structure listing local neighbor nodes for the mesh overlay network and/or at least one parent node of the tree-based backbone of the tree overlay network. Example embodiments for node listing 714 are described herein above and additionally below with particular reference to nodal rearrangement procedures as well as to locating mesh neighbor nodes and/or potential new parent backbone nodes when a failure occurs in the tree-based backbone.

The illustrated components of hybrid mesh/tree data delivery implementer 700 may alternatively perform different functions and/or implement different schemes. Moreover, they may additionally perform other functions and/or implement other schemes that are described herein, including the various more specific embodiments described with reference to flow diagrams, network organizations, and so forth.

A tree-based backbone constructed by the establishment and evolution operations described above does not necessarily minimize the latency for data stream delivery. In particular, two example non-optimal substructures can exist. They are illustrated in FIGS. 8 and 9. Nodal rearrangement procedures may be performed to combat these non-optimal substructures.

Figure 8:
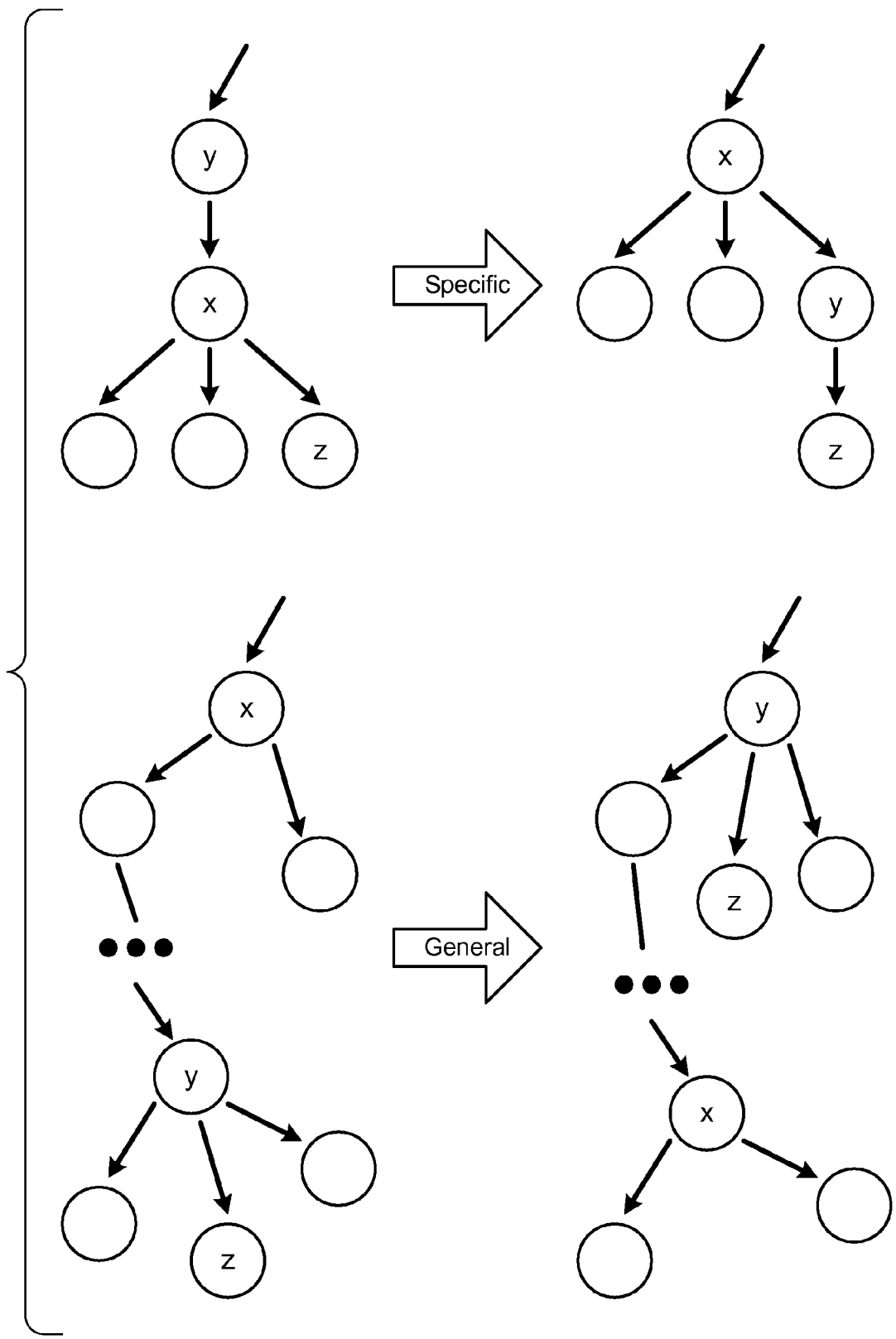
FIG. 8 depicts examples of high-degree-preemption for enhancing a tree-based backbone.
Figure 9:
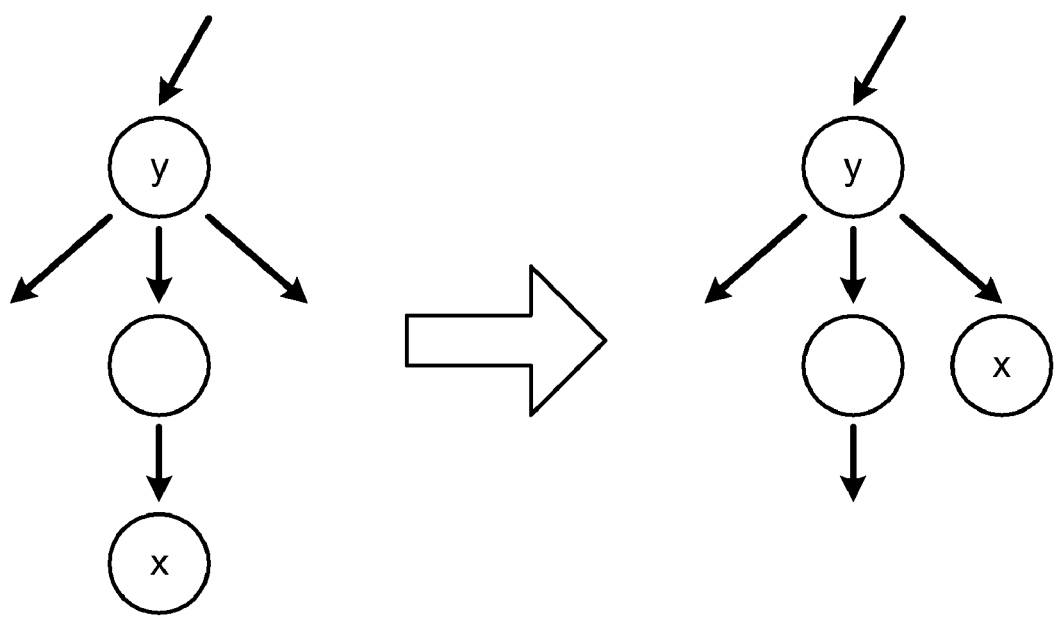
FIG. 9 depicts an example of low-delay jump for enhancing a tree-based backbone.

FIG. 8 depicts examples at 800 generally of high-degree-preemption for enhancing a tree-based backbone. The upper example is a relatively specific example, and the lower example is a relatively general example. FIG. 9 depicts an example 900 of low-delay jump for enhancing a tree-based backbone. In the former case at 800, a node has more children than its parent, and a swap of them can reduce the average depth of the tree-based backbone nodes. In the latter case at 900, a tree-based backbone node closer to the source may still have sufficient bandwidth so as to be able to accept new children; thus, a node can use this opportunity to reduce its depth in the tree-based backbone. Described below are two localized procedures that, when performed, can enhance the tree-based backbone by nodal rearrangement.

High-degree-preemption is described with reference to FIG. 8. Each tree-based backbone node x periodically checks whether it has more children than a node that is closer to the source in the tree-based backbone. Such a node, referred to as y, can be the parent of x in the tree-based backbone, a node known from x's local node list, and so forth. If such a node is found, node x preempts y's position in the tree-based backbone, and node y re-joins the tree-based backbone. In practice, it can attach itself to node x, as illustrated in the upper portion of FIG. 8.

Low-delay-jump is described with reference to FIG. 9. Each tree-based backbone node x periodically checks if there is at least one node that (i) is closer to the source than its parent node and (ii) has spare bandwidth capacity. If so and if one such node, say node y, has sufficient available bandwidth to support a new child, node x leaves its original parent and attaches itself to node y as a child.

The above two procedures may be executed by the overlay nodes iteratively until no node can further locate candidates for swapping. The average depth of the tree-based backbone nodes is monotonically decreased in the iterations, which can lead to a minimal average depth. More explicitly, the resultant tree-based backbone can have the following properties: 1) it is balanced, if each tree-based backbone node can support at least one child; and 2) the node degree is non-increasing with the node depth.

Theorem 4.2: The average depth of the tree-based backbone is minimized when high-degree-preemption and low-delay-jump terminate at each of the tree-based backbone nodes. Proof: We prove this in two steps: first, we prove that the two properties mentioned above hold for any tree with minimum average depth; second, based on this observation, we prove that both our tree and a tree with minimum depth have the same average depth.

We prove the first step by contradiction. Assume there exists a tree A that does not have the two properties but is of minimum average depth. Apparently, tree A is a balanced tree; otherwise, we can use low-delay-jump to reduce its average depth. Now consider that tree A violates the second property, i.e., there is at least one node x whose out-degree is smaller than another node y but is closer to the root. We first consider the case that y is a descendant of x (as shown in the lower general portion of FIG. 8). In this case, we can swap nodes x and y, with node y still taking its other children (e.g., node z). This operational procedure reduces the depth, which contradicts the original assumption that tree A has minimized average depth. For the case that node y is not node x's descendant, we can first swap node y with one of node x's descendants at the same level. This operation does not change the average depth, but node y now becomes a descendant of node x; so we can then apply the swapping as in the previous case to reduce tree A's average depth.

Next, we define a normalization operation that swaps only nodes at the same level if the left one has lower out-degree than the right one. This normalization does not change the average depth. We apply this operation iteratively to a tree until no swap can be applied. Such a normalized tree has the following new property: at each level, the out-degrees of the nodes are non-increasing from left to right. Given our tree-based backbone and any tree with minimum average depth, the two normalized trees are isomorphic, and thus of the same average depth. In other words, a tree-based backbone can achieve a minimum average depth after high-degree-preemption and low-delay-jump nodal rearrangement procedures are iteratively completed.

In an example embodiment, there is a level of collaboration between the tree-based backbone of the tree overlay network and the mesh overlay network within the hybrid tree/mesh overlay framework. Such collaboration may be apparent in two example respects: delivering data blocks and handling node dynamics.

With the hybrid tree/mesh overlay framework, data blocks of a data stream are delivered via two mechanisms. In general, they are pushed over the tree-based backbone. If a gap appears in the data stream received by a network node, due to temporal capacity fluctuations in the tree-based backbone and/or due to node dynamics (which are further discussed below), the network node may pull the missing data blocks over the mesh overlay network. An example embodiment for a relatively seamless push/push switching buffer implementation that coordinates the tree-based backbone and the mesh overlay to make data delivery efficient while also resilient against failure is described below.

Figure 10:
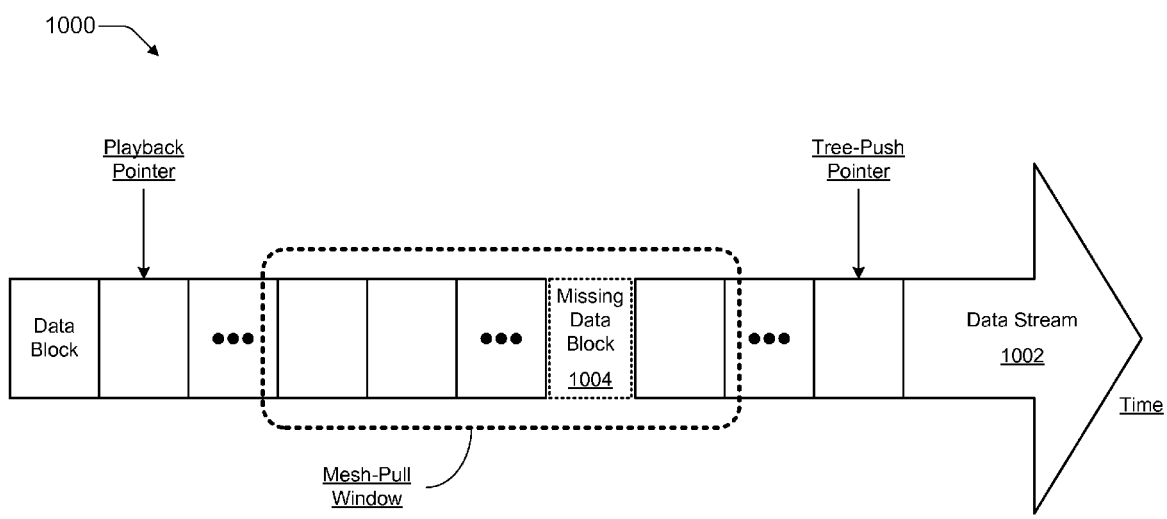
FIG. 10 is a block diagram illustrating an example of a push/pull switch buffer.

FIG. 10 is a block diagram illustrating an example of a push/pull switch buffer 1000. As illustrated, push/pull switch buffer 1000 stores a data stream 1002 with time increasing in the rightward direction. Data stream 1002 includes multiple data blocks. A tree-push pointer and a playback pointer indicate positions along push/pull switch buffer 1000. A mesh-pull window is located between these two pointers. A missing data block 1004 is shown within the mesh-pull window. As indicated by the ellipses, the length of the mesh-pull window and the distance between it and the two pointers may vary from those that are explicitly illustrated.

In operation of an example embodiment, data blocks that are newly-received via a push mechanism over the tree-based backbone of the tree overlay network are inserted into push/pull switch buffer 1000 at the tree-push pointer. In other words, the tree-push pointer can indicate the latest data block delivered via the push mechanism (unless perhaps one is delivered out-of-order). Data stream 1002 is utilized (e.g., played) at the playback pointer. When a data block is still missing (e.g., missing data block 1004) as data stream 1002 reaches the mesh-pull window, the node retrieves the missing data block from a mesh neighbor node. More specifically, the node may request and then receive the missing data block over the mesh overlay network via a pull mechanism.

In this manner, most blocks can typically be received via the push mechanism over the tree-based backbone of the tree overlay network. To avoid user-detectable delays resulting from missing data blocks, such missing data blocks can be retrieved via the pull mechanism of the mesh overlay network when they are ascertained to be missing within the mesh-pull window. Consequently, missing data blocks can usually be retrieved prior to their location progressing to the playback pointer.

When a network node is temporarily disconnected from the tree-based backbone, its tree-push pointer can be disabled. The mesh-pull window is then used to pull data from its mesh neighbor nodes. When the network node connects to the tree-based backbone again, the tree-push pointer can be reactivated. In a described implementation, the location of the mesh-pull window is maintained behind the tree-push pointer; hence, it does not request data blocks that are currently being delivered by the tree-based backbone. Consequently, few (if any) duplicated data blocks may be received at the network node from both the tree-based backbone and the mesh overlay network.

FIG. 11 is a flow diagram 1100 that illustrates an example of a method for operating a push/pull switch buffer. Flow diagram 1100 includes six (6) blocks 1102-1112. In an example embodiment, at block 1102, a network node is receiving data block(s) from a parent node over a tree-based backbone of a tree overlay network via a push mechanism. At block 1104, data block(s) received via the push mechanism are inserted into a push/pull switch buffer (e.g., at a tree-push pointer).

At block 1106, the network node ascertains if one or more data blocks are missing in the mesh-pull window of the push/pull switch buffer. If not, the method of flow diagram 1100 continues at block 1102. If, on the other hand, at least one data block is ascertained to be missing within the mesh-pull window, then at block 1108, the network nodes requests the missing data block from at least one neighbor node of a mesh overlay network via a pull mechanism.

At block 1110, the missing data block is received from the neighbor node(s) over the mesh overlay network via the pull mechanism. At block 1112, the network node inserts the data block received via the pull mechanism into the push/pull switch buffer at the position of the missing data block, which may still be located within the mesh-pull window.

A network node may gracefully depart the network overlay, or it may abruptly fail without any notification. For an example embodiment, in the former situation, the network node proactively informs its mesh neighbors of the mesh overlay network and at least its tree-based backbone children if it resides in the tree-based backbone as a stable node. In the latter situation, the abrupt departure can be detected by the mesh neighbors after a silent period with no control message exchange; it may also be detected by the children nodes in the tree-based backbone after observing persistent losses. In either case, the mesh neighbors reestablish neighbor relationships, or neighborships, with other known nodes from their local node lists; additionally, the children of the departing/failing node relocate to different parents in the tree-based backbone.

If the affected child is an unstable node in the outskirts of the tree-based backbone, it can consult/access its local node list and directly attach to a different parent node that is nearest to the source node and has sufficient available bandwidth. On the other hand, if the affected child is a stable node, it rejoins the tree-based backbone. To this end, the node first locates a tree-based backbone node having sufficient available bandwidth, and then second it attaches itself thereto. If no such stable backbone node is known, the node can preempt the position of an unstable node that is currently a child of a stable backbone node. In these dynamic-node-handling processes, the mesh overlay temporarily takes over data delivery until the tree-based backbone is repaired.

Example Device Implementations for a Hybrid Tree/Mesh Overlay for Data Delivery

Figure 12:
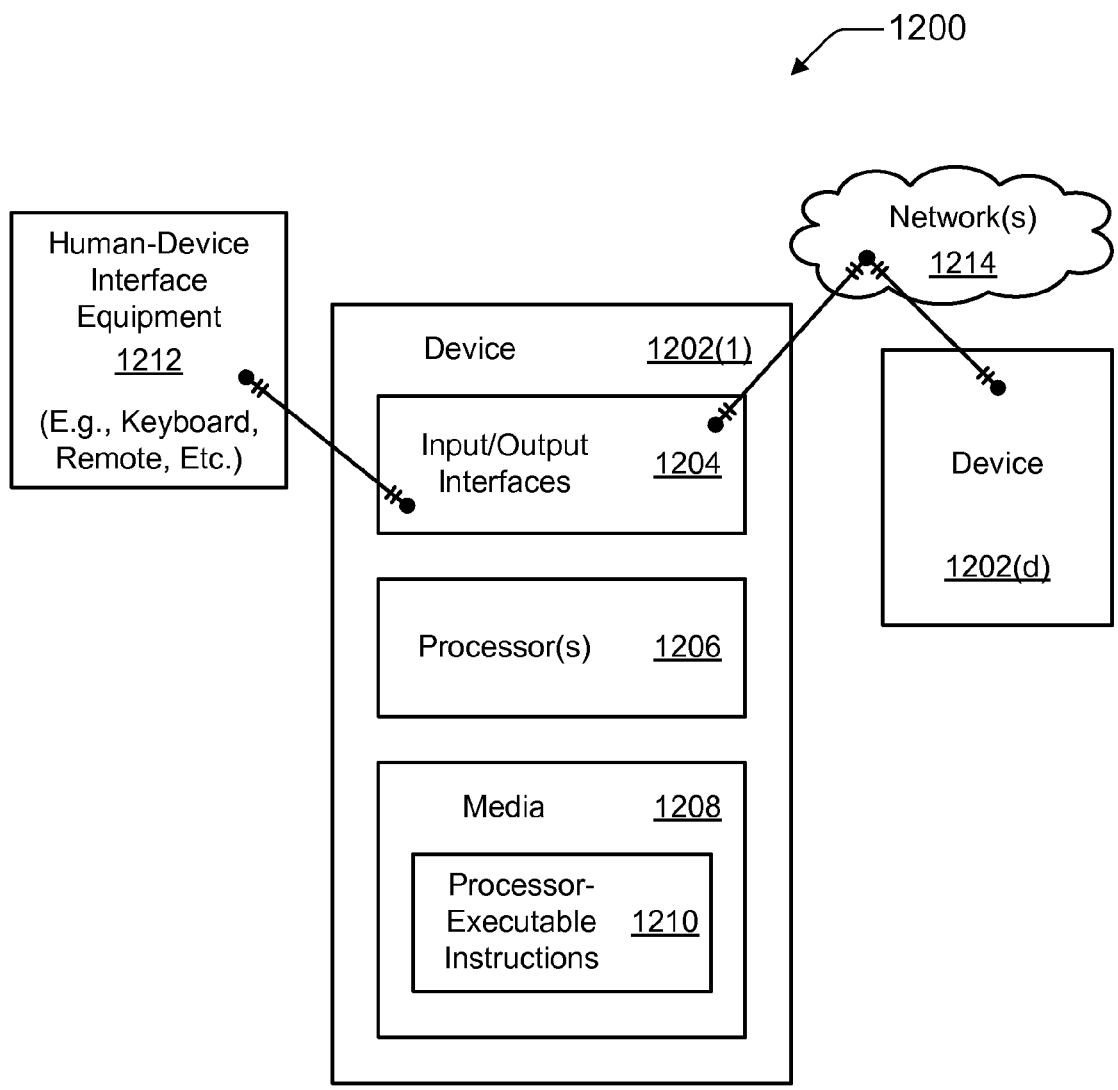
FIG. 12 is a block diagram of an example device that may be used to implement a hybrid tree/mesh overlay for data deliveries.

FIG. 12 is a block diagram 1200 of an example device 1202 that may be used to implement a hybrid mesh/tree overlay with data deliveries. Network nodes 102 (e.g., of FIG. 1 et seq.) may be realized as devices 1202. As illustrated, two devices 1202(1) and 1202(d) are capable of engaging in communications via network(s) 1214. Although two devices 1202 are specifically shown, one or more than two devices 1202 may be employed, depending on implementation. Network(s) 1214 may be, by way of example but not limitation, an internet, an intranet, an Ethernet, a public network, a private network, a cable network, a digital subscriber line (DSL) network, a telephone network, a Fibre network, a Grid computer network, a wired network, a wireless network, a mesh network, a peer-to-peer (P2P) network, an avenue to connect to any such network, some combination thereof, and so forth. Alternatively, two devices 1202 may be directly connected.

Generally, a device 1202 may represent any computer or processing-capable device, such as a server device; a workstation or other general computer device; a data storage repository apparatus; a personal digital assistant (PDA); a mobile phone; a gaming platform; an entertainment device; a router computing node; a mesh or other network node; a wireless access point; some combination thereof; and so forth. As illustrated, device 1202 includes one or more input/output (I/O) interfaces 1204, at least one processor 1206, and one or more media 1208. Media 1208 include processor-executable instructions 1210.

In an example embodiment of device 1202, I/O interfaces 1204 may include (i) a network interface for communicating across network 1214, (ii) a display device interface for displaying information on a display screen, (iii) one or more human-device interfaces, and so forth. Examples of (i) network interfaces include a network card, a modem, one or more ports, a network communications stack, a radio, and so forth. Examples of (ii) display device interfaces include a graphics driver, a graphics card, a hardware or software driver for a screen or monitor, and so forth. Examples of (iii) human-device interfaces include those that communicate by wire or wirelessly to human-device interface equipment 1212 (e.g., a keyboard, a remote, a mouse or other graphical pointing device, etc.).

Generally, processor 1206 is capable of executing, performing, and/or otherwise effectuating processor-executable instructions, such as processor-executable instructions 1210. Media 1208 is comprised of one or more processor-accessible media. In other words, media 1208 may include processor-executable instructions 1210 that are executable by processor 1206 to effectuate the performance of functions by device 1202. Processor-executable instructions may be embodied as software, firmware, hardware, fixed logic circuitry, some combination thereof, and so forth.

Thus, realizations for hybrid tree/mesh overlays for data delivery may be described in the general context of processor-executable instructions. Generally, processor-executable instructions include routines, programs, applications, coding, modules, protocols, objects, components, metadata and definitions thereof, data structures, application programming interfaces (APIs), etc. that perform and/or enable particular tasks and/or implement particular abstract data types. Processor-executable instructions may be located in separate storage media, executed by different processors, and/or propagated over or extant on various transmission media.

Processor(s) 1206 may be implemented using any applicable processing-capable technology, and one may be realized as a general purpose processor (e.g., a central processing unit (CPU), a microprocessor, a controller, etc.), a graphics processing unit (GPU), a special-purpose processor, a derivative or combination thereof, and so forth. Media 1208 may be any available media that is included as part of and/or accessible by device 1202. It includes volatile and non-volatile media, removable and non-removable media, storage and transmission media (e.g., wireless or wired communication channels), hard-coded logic media, combinations thereof, and so forth. Media 1208 is tangible media when it is embodied as a manufacture and/or as a composition of matter. For example, media 1208 may include an array of disks or flash memory for longer-term mass storage of processor-executable instructions 1210, random access memory (RAM) for shorter-term storing of instructions that are currently being executed and/or otherwise processed, link(s) on network 1214 for transmitting communications, and so forth.

As specifically illustrated, media 1208 comprises at least processor-executable instructions 1210. Generally, processor-executable instructions 1210, when executed by processor 1206, enable device 1202 to perform the various functions described herein. Such functions include, but are not limited to: (i) those acts that are illustrated in the flow diagrams (of FIGS. 2, 6, and 11); (ii) those actions implementable by the illustrated components for hybrid tree/mesh data delivery (of FIG. 7); (iii) those actions undertaken to establish, evolve, enhance, or otherwise organize an overlay network (e.g., of FIGS. 1, 3, 4, 5, 8, and 9); (iv) the push/pull coordination between a tree overlay network and a mesh overlay network (e.g., of FIGS. 10 and 11); combinations thereof; and so forth.

The devices, acts, aspects, features, functions, procedures, nodes, data structures, techniques, components, etc. of FIGS. 1-12 are illustrated in diagrams that are divided into multiple blocks and other elements. However, the order, interconnections, interrelationships, layout, etc. in which FIGS. 1-12 are described and/or shown are not intended to be construed as a limitation, and any number of the blocks and/or other elements can be modified, combined, rearranged, augmented, omitted, etc. in any manner to implement one or more systems, methods, devices, procedures, media, apparatuses, arrangements, etc. for hybrid tree/mesh overlays for data delivery.

Although systems, media, devices, methods, procedures, apparatuses, mechanisms, schemes, approaches, processes, arrangements, and other example embodiments have been described in language specific to structural, logical, algorithmic, and functional features and/or diagrams, it is to be understood that the invention defined in the appended claims is not necessarily limited to the specific features or acts described above. Rather, the specific features and acts described above are disclosed as example forms of implementing the claims.

What is claimed is:

1. A method for a node in a network, the method comprising:

entering a mesh overlay network that enables data retrieval via a pull mechanism;

attaching to a tree overlay network that includes a subset of nodes forming a tree-based backbone that provides a data stream via a push mechanism;

receiving data blocks of a data stream over the tree-based backboned of the tree overlay network via the push mechanism;

for missed data blocks of the data stream that are not received over the tree-based backbone of the tree overlay network, retrieving the missed data blocks over the mesh overlay network via the pull mechanism;

determining an age of the node based at least on time elapsed since an arrival time of the node in at least one of the mesh overlay network and/or the tree overlay network;

obtaining a session length for the data stream;

computing a temporal stability threshold responsive to the session length and the arrival time;

checking if the age of the node satisfies the temporal stability threshold; and if the age of the node does satisfy the temporal stability threshold, joining tree-based backbone to provide the data stream via the push mechanism.

2. The method as recited in claim 1, wherein the age of the node is based on a time when the node performed the act of attaching to the tree overlay network that includes the tree-based backbone providing the data stream via the push mechanism.

3. The method as recited in claim 1, wherein the temporal stability threshold is set responsive to a residual session length for delivery of a remaining portion of the data stream.

4. The method as recited in claim 1, further comprising:
after the age of the node satisfies the temporal stability threshold, forwarding the data blocks of the data stream over the tree-based backbone via the push mechanism to one or more children nodes that are attached to the tree overlay network.

5. The method as recited in claim 1, further comprising:
attempting to enhance the tree-based backbone of the tree overlay network by engaging in one or more nodal rearrangement procedures.

6. The method as recited in claim 1, wherein obtaining the session length for the data stream comprises at least obtaining the session length for the data stream from a source node that originates delivery of the data stream.

7. The method as recited in claim 1, further comprising:
determining if the node satisfies a probabilistic promotion criterion based on the age of the node; and
if the node does satisfy the probabilistic promotion criterion based on the age of the node, joining the tree-based backbone to provide the data stream via the push mechanism.

8. The method as recited in claim 1, further comprising:
ascertaining if a data block of the data stream is missing from a mesh-pull window of a push/pull switch buffer, the mesh-pull window located between a tree-push pointer and a playback pointer; and
if a data block is ascertained to be missing from the mesh-pull window:
requesting the missing data block from at least one neighbor node of the mesh overlay network via the pull mechanism;
responsive to the requesting, receiving the missing data block from the at least one neighbor node of the mesh overlay network via the pull mechanism; and
inserting the received missing data block into the mesh-pull window of the push/pull switch buffer.

9. The method as recited in claim 1, further comprising:
detecting if an upstream parent node has ceased forwarding the data blocks of the data stream over the tree-based backbone of the tree overlay network via the push mechanism; and
if an upstream parent node is detected to have ceased forwarding the data blocks of the data stream over the tree-based backbone of the tree overlay network via the push mechanism:
temporarily retrieving upcoming data blocks of the data stream from one or more neighbor nodes of the mesh overlay network via the pull mechanism until the node can attach to a different upstream parent node of the tree-based backbone of the tree overlay network;
locating a different upstream parent node of the tree-based backbone of the tree overlay network;
attaching to the different upstream parent node of the tree-based backbone of the tree overlay network; and
receiving future data blocks of the data stream from the different upstream parent node over the tree-based backbone of the tree overlay network via the push mechanism.

10. A device operating as anode in a network, the device comprising:
a processor for executing instructions, the instructions for configuring the device comprising:
a mesh overlay network interface to enter a mesh overlay network that enables data retrieval via a pull mechanism;
a tree overlay network interface to attach to a tree overlay network, the tree overlay network including a subset of nodes forming a tree-based backbone that provides a data stream via a push mechanism;
a tree network handler to receive data blocks of the data stream over the tree-based backbone of the tree overlay network via the push mechanism;
a mesh network handler to retrieve missed data blocks, which are not received over the tree-based backbone of the tree overlay network, over the mesh overlay network via the pull mechanism;
a data delivery implementer to:
determine an age of the node based at least on time elapsed since an arrival time of the node in at least one of the mesh overlay network and/or the tree overlay network;
obtain a session length for the data stream; compute a temporal stability threshold responsive to the session length and the arrival time; and
a tree-based backbone joiner to check if the age of the node satisfies the temporal stability threshold and to join the tree-based backbone to provide the data stream via the push mechanism when the age of the node does satisfy the temporal stability threshold.

11. The device as recited in claim 10, wherein the network comprises a peer-to-peer (P2P) network; and wherein the mesh overlay network interface, the tree overlay network interface, the tree network handler, the mesh network handler, and the tree-based backbone joiner each operate at an application-layer.

12. The device as recited in claim 10, further comprising:
a push/pull switch buffer that interacts with the mesh network handler and the tree network handler to store incoming data blocks that are to be played; the push/pull switch buffer including a tree-push pointer, a playback pointer, and a mesh-pull window located between the tree-push pointer and the playback pointer;
wherein the tree network handler inserts received data blocks of the data stream into the push/pull switch buffer at the tree-push pointer.

13. The device as recited in claim 12, wherein at least one of the mesh network handler or the push/pull switch buffer ascertains that a data block is missing when it is not present within the mesh-pull window.

14. A method for a node in a network, the method comprising:
entering a mesh overlay network;
attaching to a tree overlay network;
receiving data blocks of a data stream over the tree overlay network via a push mechanism of a primary delivery role;
ascertaining if a data block of the data stream is not received via the push mechanism of the primary delivery role;
if a data block of the data stream is ascertained to not be received via the push mechanism of the primary delivery role, retrieving the data block over the mesh overlay network via a pull mechanism of a secondary delivery role
determining an age of the node based at least on time elapsed since an arrival time of the node in at least one of the mesh overlay network and/or the tree overlay network;

obtaining a session length for the data stream;
computing a temporal stability threshold responsive to the session length and the arrival time;
checking if the age of the node satisfies the temporal stability threshold; and
if the age of the node does satisfy the temroral stability threshold, joining a tree-based backbone to provide the data stream via the push mechanism.

15. The method as recited in claim 14, wherein the act of retrieving comprises:
requesting the data block from a neighbor node of the mesh overlay network; and
responsive to the requesting, receiving the data block from the neighbor node over the mesh overlay network via the pull mechanism of the secondary delivery role.

16. The method as recited in claim 14, wherein:
the act of attaching comprises attaching to the tree-based backbone wherein the tree-based backbone is comprised of multiple nodes that are classified as stable with respect to the data stream; and
the act of receiving comprises receiving the data blocks of the data stream over the tree-based backbone.

17. The method as recited in claim 16, further comprising:
determining if the temporal stability threshold for the node is satisfied based on when the node attached to the tree-based backbone; and
if the temporal stability threshold for the node is determined to be satisfied, joining the tree-based backbone of the tree overlay network.

18. The method as recited in claim 17, wherein the act of joining comprises:
forwarding the data blocks of the data stream toward downstream children via the push mechanism.

19. The method as recited in claim 14, further comprising:
if a data block of the data stream is ascertained to not be received via the push mechanism of the primary delivery role:
detecting if an upstream parent has ceased forwarding the data blocks of the data stream over the tree overlay network via the push mechanism; and
if an upstream parent is detected to have ceased forwarding the data blocks of the data stream over the tree overlay network via the push mechanism, retrieving the data blocks of the data stream from one or more neighbor nodes of the mesh overlay network until the node can attach to a different upstream parent of the tree overlay network.

20. The method as recited in claim 14, wherein the node comprises an endhost, and the data stream comprises a media data stream; and wherein the act of receiving comprises participating in a multicasting.

* * * * *